A. E. OGREN.
TAP AND DIE HOLDER.
APPLICATION FILED SEPT. 21, 1917.
1,270,051.
Patented June 18, 1918.
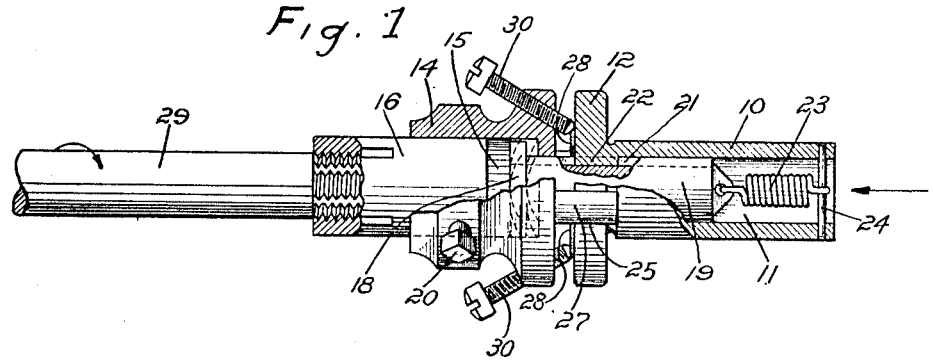
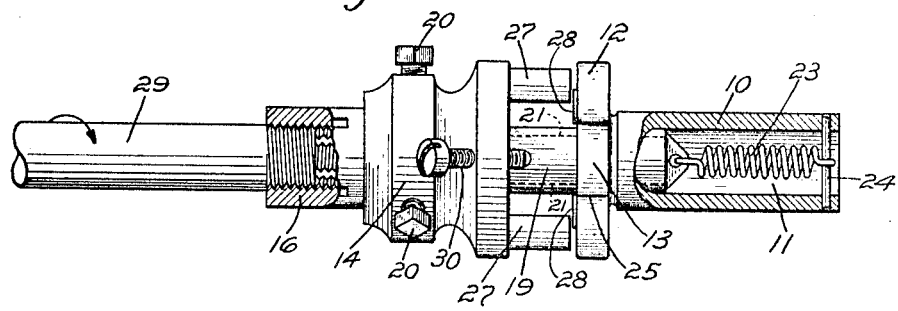
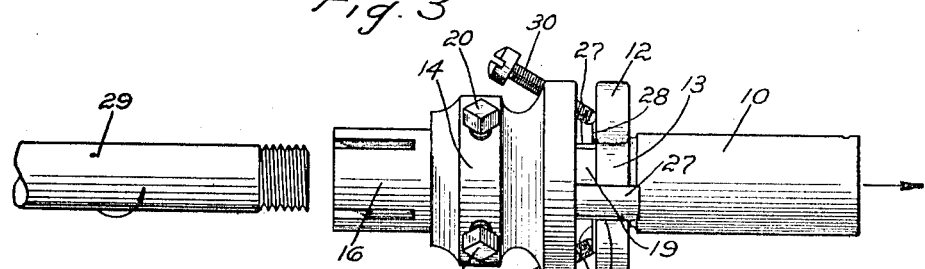
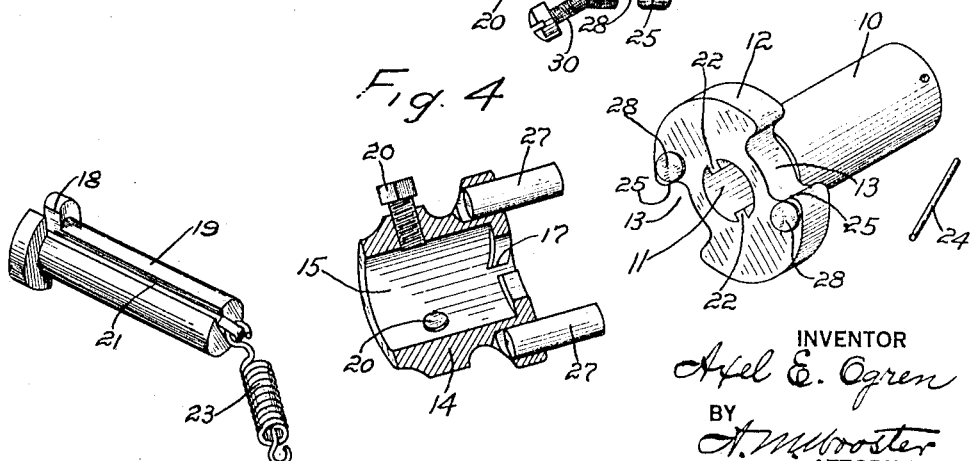
INVENTOR
Axel E. Ogren
BY
A. M. Broster
ATTORNEY

UNITED STATES PATENT OFFICE.

AXEL E. OGREN, OF DERBY, CONNECTICUT.

TAP AND DIE HOLDER.

1,270,051.    Specification of Letters Patent.    Patented June 18, 1918.

Application filed September 21, 1917. Serial No. 192,480.

*To all whom it may concern:*

Be it known that I, AXEL E. OGREN, a citizen of the United States, residing at Derby, county of New Haven, State of Connecticut, have invented an Improvement in Tap and Die Holders, of which the following is a specification.

This invention has for its object the production of a tool holder for taps and dies adapted for use on thread cutting machine tools and especially adapted for use on automatic screw machines, which shall be so constructed as to insure accuracy and dependability and in the event of failure of any of the parts of the machine to function properly from any cause, as, improper adjustment or timing, or the slipping of a belt, the parts of the holder will separate and thus prevent any injury to or breakage of the holder, or the tap or die carried thereby, thus eliminating an important item of expense heretofore resulting from the loss of expensive dies, taps and holders, and from the loss of time in making repairs and new adjustments.

With these and other objects in view, I have devised the novel tool holder provided with a yielding element, which I will now describe referring to the accompanying drawing forming a part of this specification and using reference characters to indicate the several parts.

Figure 1 is a view partly in elevation and partly in longitudinal section, showing the position of the parts at the instant the work is engaged by a tap or die, a die being illustrated;

Fig. 2 a similar view, showing the position of the parts at the end of the threading operation;

Fig. 3 an elevation showing the work disengaged and the parts at their normal position again at the end of the reverse movement, and Fig. 4 is a perspective view, on an enlarged scale, partly in section, showing the parts of my novel holder disassembled.

10 denotes the body of the holder which is provided with a longitudinal hole 11, and with a flange 12, having peripheral notches 13. 14 denotes the head which is provided with a socket 15 to receive a tool 16, *i. e.* a tap or a die, the inner end of the head being provided with a clutch member 17. 18 denotes the coöperating clutch member which lies within the socket and is provided with a shank 19 which passes through the base of the head. The tool is locked in the head by means of set screws 20. It will of course be understood that the attachment of a tap is precisely the same as that of a die. If the shank of either tap or die is smaller than the socket, a bushing is used having holes corresponding with the screw holes in the head, the set screws engaging and centering the tap or die in the head, as before. In order to lock the sliding clutch member against rotation the shank of said member is provided with grooves 21 which are engaged by ribs 22 in hole 11 in the body. The inner end of shank 19 is connected by means of a spring 23 with a cross pin 24 at the rear end of the hole in the body. Both spring and pin are made amply strong to stand the ordinary strains of use, but under extraordinary conditions, as will be more fully explained, the spring will break or the pin will bend and thus prevent damage to either the holder or the tool carried thereby. At the operative ends of notches 13 in the flange of the body are shoulders 25 which are adapted to be engaged by pins 27 extending rearwardly from the head. 28 denotes hardened pins which are set into the flange contiguous to shoulders 25. The object of these pins is to prevent pins 27 from marring the surface of the flange when they clear the notches, as will be more fully explained. The projecting ends of the hardened pins, in fact comprise the operative face of the flange. The work is indicated by 29 and the length of the thread cut thereon corresponds, with the exception noted later, with the distance between the surfaces of the hardened pins and the inner ends of pins 27. This distance being determined by adjustment of screws 30 in the head.

The operation is as follows:—I have not shown the head stock and turret of an automatic screw machine or lathe, as specifically they form no part of the present invention. It will of course be understood that the body is locked in the turret, and the work is fed in through the head stock by which it is gripped and rotated. Assuming that it is desired to cut a short thread, the head and body are adjusted relatively to each other by means of screws 30, that is, so that the distance from the inner ends of pins 27 to the faces of the hardened pins (that is, the operative face of the flange)

will correspond with the length of the thread that it is desired to cut on the work. After adjustment of the machine the movements are all automatic. The body first moves toward the left, as seen in the drawing, until the tool is engaged with the work and then stops. During the thread cutting operation, pins 27 will lie in engagement with shoulders 25 and the head, being locked against rotation, will be drawn outward against the power of the spring, until pins 27 clear the shoulders and also the hardened pins which project slightly from the face of the flange, for the purpose stated. The head and tool (either tap or die) will then revolve with the work for an instant, clutch member 17 sliding over clutch member 18, but the machine is so timed that the work reverses almost instantly. This causes the clutch members to engage which locks the head against rotation. The reverse rotation of the work will now tend to unthread the tool and move the head backward, which movement is assisted by the pull of the spring and also by the backward movement of the body which commences to move slowly and then moves more rapidly toward the right. The instant the tool clears the work, the spring will return clutch member 18 and with it the head to their normal position, as in Fig. 1. The clutch members are so located relatively to grooves 21 and ribs 22 that pins 27 must pass into the notches when the backward movement of the head takes place.

Suppose now, that owing to any of the possible causes, as improper adjustment or timing, or the slipping of a belt, the tool sticks and does not unthread from the work. With the tool holders now in use, breakage of either tool or holder is likely to occur. This is wholly prevented, however, in my novel construction as the spring and cross pin 24 take all the strain and either the spring will break or the pin will bend so that the backward movement of the body will do no harm other than injury to the spring and cross pin which are inexpensive and can be readily replaced, whereas breakage of either tool or holder causes serious expense and loss of time. It will be understood of course that pins 27 cannot reengage the notches until after the tool has become disengaged from the work so that, in the event of proper clearance, the normal operations of machine, tool holder and tool succeed each other in proper order, and it is only in the event of failure of clearance of tool and work that breaking of the spring or bending of the cross pin can take place.

Should it be required to cut a relatively long thread, that is a thread longer than can be conveniently provided for by the length of pins 27 (which may of course be changed if required) in connection with adjusting screws 30, the machine is so timed that a portion of the thread will be cut during the forward movement of the body and before the pins commence to move out of engagement with the notches. After this predetermined portion of the thread has been cut, the withdrawing movement of the pins and the succeeding operations take place as before, with the exception that the last portion of the withdrawing movement of the tool from the work is performed by backward movement of the body. For example, if an inch and one-half thread was to be cut, the first inch of the thread might be cut during the forward movement of the body with the parts in the position shown in Fig. 1. After this portion of the thread has been cut, the forward movement of the body would stop and the last half inch of the thread would be cut in the manner already described, pins 27 moving out of engagement with the shoulders and the hardened pins. In the unthreading operation, the first half inch of the unthreading would be performed in the manner already described. As this is the portion of the operation when breakage is likely to occur, my novel tool holder is just as effective in the cutting of relatively long threads as in cutting relatively short threads. When the first half inch of the unthreading has been performed, in the manner described, the body will commence to move backward, that is toward the right, as seen in the drawing, and the unthreading operation will be completed during this movement of the body.

Having thus described my invention, I claim:—

1. A holder of the character described, comprising a head having a socket for a tool and a clutch member, a sliding clutch member having a shank passing through the base of the head, a body, adapted for attachment to a machine, in which the shank has longitudinal movement but is locked against rotation, a coil spring attached to the shank and to the body, and a connection between the head and the sliding clutch member corresponding with a predetermined length of thread to be cut, the cutting of a thread causing longitudinal movement of the head and sliding clutch member relatively to the body and reversal of the work causing the clutch members to engage and the tool to unthread after which the head and sliding clutch member are returned to their normal position by the spring.

2. A holder of the character described, comprising a head having a socket for a tool and a clutch member, a sliding clutch member having a shank passing through the base of the head, a body, adapted for attachment to a machine, in which the shank has longitudinal movement but is locked against rotation, a coil spring attached to the shank, a relatively weak cross pin in the body to which the other end of the spring is attached, and a connection between the head and the sliding clutch member corresponding with a predetermined length of thread to be cut, said pin being adapted to bend and thus prevent breakage of any part should the tool stick in the unthreading operation.

3. A holder of the character described, comprising a head having a socket for a tool and a clutch member, a sliding clutch member having a shank passing through the base of the head, a body in which the shank has longitudinal movement but is locked against rotation, a connection between the head and the sliding clutch member, a coil spring attached to the shank and a relatively weak cross pin in the body to which the other end of the spring is attached.

4. A holder of the character described, comprising a head having a clutch member and rearwardly extending pins, a sliding clutch member having a shank passing through the base of the head, a body in which the shank has longitudinal movement but is locked against rotation and which is provided with shoulders adapted to be engaged by the pins, and a yielding connection between the shank and the body.

5. A holder of the character described, comprising a head having a clutch member and rearwardly extending pins, a sliding clutch member having a shank passing through the base of the head and provided with longitudinal grooves, a body having shoulders adapted to be engaged by the pins and having a longitudinal hole which receives the shank and is provided with ribs engaging the grooves, a relatively weak cross pin in the hole and a coil spring attached to the shank and to the cross pin.

6. A holder of the character described, comprising a head having a clutch member and rearwardly extending pins, a sliding clutch member having a shank passing through the base of the head, a body in which the shank has longitudinal movement but is locked against rotation and which is provided with a flange having notches terminating in shoulders adapted to be engaged by the pins, a coil spring attached to the shank and to the body, and adjusting screws in the head which bear against the flange and determine the longitudinal adjustment of the pins relatively to the body.

7. A holder of the character described, comprising a head having a clutch member and rearwardly extending pins, a sliding clutch member having a shank passing through the base of the head, a body in which the shank has longitudinal movement but is locked against rotation, and which is provided with a flange having notches terminating in shoulders, hardened pins in the flange contiguous to the shoulders, said shoulders and hardened pins being adapted to be engaged by the first mentioned pins, and a yielding connection between the shank and the body.

8. A tool of the character described, comprising a head having a clutch member, a sliding clutch member having a shank passing through the base of the head, a body in which the shank has longitudinal movement but is locked against rotation, a yielding connection between the shank and the body, and a connection between the head and the sliding clutch member corresponding with a predetermined length of thread to be cut.

9. A tool of the character described, comprising a head having a clutch member, a sliding clutch member having a shank passing through the base of the head, a body in which the shank has longitudinal movement but is locked against rotation, a yielding connection between the shank and the body, a connection between the head and the sliding clutch member corresponding with a predetermined length of thread to be cut, and means for adjusting the head relatively to the sliding clutch member.

10. A holder of the character described, comprising a head having a socket for a tool and a clutch member, a sliding clutch member having a shank passing through the base of the head, a body in which the shank has longitudinal movement but is locked against rotation, a connection between the head and the sliding clutch member, and a yielding connection between the sliding clutch member and the body.

11. A holder of the character described, comprising a head having a socket for a tool and a clutch member, a sliding clutch member having a shank passing through the base of the head, a body in which the shank has longitudinal movement but is locked against rotation and which is provided with shoulders, pins extending from the head and engaging the shoulders, and a coil spring attached to the shank and to the body.

In testimony whereof I affix my signature.

AXEL E. OGREN.